(12) United States Patent
Botros

(10) Patent No.: US 8,685,539 B2
(45) Date of Patent: *Apr. 1, 2014

(54) GRAFT COMPOSITION HAVING LONG CHAIN BRANCHED OLEFINS FOR IMPROVED LAYERS

(75) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,549

(22) Filed: Aug. 26, 2011

(65) Prior Publication Data

US 2013/0052471 A1    Feb. 28, 2013

(51) Int. Cl.
*B32B 27/08* (2006.01)
*B32B 27/30* (2006.01)
*B32B 27/32* (2006.01)
*B32B 27/34* (2006.01)
*C09J 123/04* (2006.01)
*C09J 123/16* (2006.01)
*C09J 151/06* (2006.01)

(52) U.S. Cl.
USPC ........ 428/476.9; 428/501; 428/515; 428/516; 428/519; 428/521; 524/504; 525/70; 525/74; 525/87

(58) Field of Classification Search
None
See application file for complete search history.

(56) References Cited

U.S. PATENT DOCUMENTS

| | | | |
|---|---|---|---|
| 4,460,745 A | | 7/1984 | Adur et al. |
| 4,619,972 A | * | 10/1986 | Inoue et al. .................. 525/193 |
| 4,684,576 A | | 8/1987 | Tabor et al. |
| 2005/0163996 A1 | * | 7/2005 | Lee et al. .................. 428/355 R |
| 2008/0032148 A1 | | 2/2008 | Lee et al. |
| 2010/0174036 A1 | | 7/2010 | Lee et al. |
| 2011/0105675 A1 | | 5/2011 | Botros et al. |

FOREIGN PATENT DOCUMENTS

WO    WO 2009035885 A1 *  3/2009

OTHER PUBLICATIONS

PCT International Search Report and the Written Opinion—Mailed Jan. 17, 2013 for Corresponding PCT/US2012/052331.

* cited by examiner

*Primary Examiner* — Monique Jackson

(57) ABSTRACT

A tie layer adhesive composition for multilayer structures made up of graft composition compounded with a base resin, such as linear low density polyethylene (LLDPE), and a polyethylene having long chain branching, such as low density polyethylene (LDPE), and optionally one or more additives. The graft composition can be made up of a blend of a grafted polyolefin and an olefin elastomer and/or the reaction product of a live, grafted polyolefin and an olefin elastomer.

15 Claims, 1 Drawing Sheet

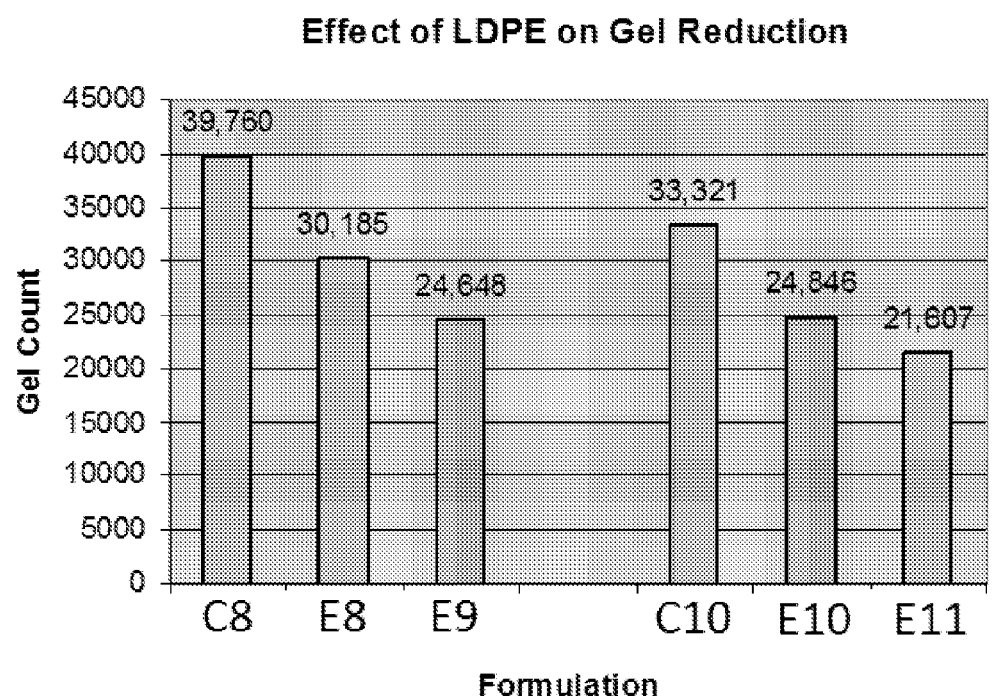

GRAFT COMPOSITION HAVING LONG CHAIN BRANCHED OLEFINS FOR IMPROVED LAYERS

FIELD OF THE INVENTION

The present disclosure relates to adhesives and tie layer adhesive compositions for multilayer structures. In particular the tie layer adhesive is made up of a graft composition compounded with a base resin and a polyethylene having long chain branching.

BACKGROUND OF THE INVENTION

Tie-layer adhesives are used to bond polyolefins to dissimilar substrates in multilayer, co-extruded structures, particularly for blown and cast film, extrusion coating, blow molding, sheet extrusion, wire & cable, pipe, and other industrial applications. The tie-layer adhesive typically comprises a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar® resins, product of Equistar Chemicals, LP, which are anhydride-modified polyolefins.

In addition to the base resin and grafted polyolefin, tie-layer adhesives commonly include other polymer resins or additives to provide better adhesion, clarity, or other benefits. Usually, there are tradeoffs. For instance, modifications that improve adhesion often reduce clarity, and vice versa.

Elastomers—random or block copolymers—are commonly included in tie-layer adhesive compositions to improve compatibility, increase adhesion, or impart other benefits. Styrene-based block copolymers, for instance, have been used to improve adhesion in multilayer constructions that require bonding of polyethylene to a styrenic polymer (U.S. Pat. Appl. Publ. Nos. 2007/0071988 and 2007/0167569).

Other commonly used elastomers include olefin elastomers, such as ethylene-propylene rubber (EPR) or ethylene-propylene-diene monomer rubber (EPDM).

Many references teach to blend an olefin elastomer with other tie-layer adhesive components (see, e.g., U.S. Pat. Appl. Publ. Nos. 2004/0097637, 2008/0032148, 2009/0035594, and 2010/0174036), but none of these references suggests reacting the olefin elastomer with the grafted polyolefin during the manufacture of the grafted polyolefin.

Clarity of multilayer films is often an issue, particularly for the food packaging industry. Wraps for meat and cheese, snack foods, baking mixes, and many others uses require barrier layers (e.g., EVOH, polyamides, polyolefins) to prevent transmission of oxygen and/or moisture, and making such structures with high clarity poses a formidable challenge. Additives, such as the bicyclic modifiers of U.S. Pat. Appl. Publ. No. 2007/0054142, are sometimes employed to improve clarity without sacrificing adhesion.

U.S. Pat. Appl. Publ. No. 2010/0174036 teaches that tie-layer adhesives useful for multilayer films having a favorable balance of clarity and adhesion can be made by blending, in sequence, a grafted ("maleated") polyolefin, a polyolefin elastomer, and LLDPE.

U.S. application Ser. No. 12/924,540 discloses a graft composition useful for tie-layer adhesives and multilayer structures having improved adhesion and clarity, where the graft composition contains an LLDPE and the reaction product of a live, grafted polyolefin and an olefin elastomer.

Improved tie-layer adhesive compositions suitable for use in making multilayer structures with good adhesion and high clarity are needed. A valuable approach would avoid expensive additives and performance tradeoffs. Ideally, improved tie-layer adhesives could be made using economical starting materials, commonly used equipment, and familiar techniques.

SUMMARY OF THE INVENTION

In some embodiments, the present disclosure is directed to a composition, suitable for use as tie-layer adhesive composition, or process for making the composition containing
  A) from 1 to 30 percent by weight of a grafted polyolefin composition;
  B) from 65 to 85 percent by weight of a linear polyethylene;
  C) from 0.5 to 25 percent by weight of a polyethylene having long chain branching; and
  D) optionally one or more additives.

The expression "grafted polyolefin composition" as used herein refers to a composition containing at least one polyolefin grafted with an unsaturated monomer (hereinafter referred to as "grafted polyolefin"), typically an unsaturated polar monomer, preferably containing one or more oxygen atoms. Preferred examples of such unsaturated monomers will be given hereinafter.

In particular, the grafted polyolefin composition A) can be selected from:
A) (i) a blend of a grafted polyolefin and an olefin elastomer; and
A) (ii) the reaction product of a live, grafted polyolefin and an olefin elastomer.

In further embodiments, the grafted polyolefin is high-density polyethylene (HDPE) grafted with maleic anhydride and the olefin elastomer is ethylene Propylene rubber (EPR) or ethylene-propylene-diene monomer rubber (EPDM).

In additional embodiments the linear polyethylene in component B) is a linear low density polyethylene (LLDPE) and the branched polyethylene in component C) is a low density polyethylene (LDPE). The additives composition can include antioxidants, stabilizers, and combinations thereof.

In further embodiments, the composition can be used as a tie layer for a multi-layer structure.

BRIEF DESCRIPTION OF THE DRAWING

FIG. 1 shows the effect of LDPE on gel reduction.

DETAILED DESCRIPTION OF THE INVENTION

A detailed description of embodiments of the present composition and process is disclosed herein. However, it is to be understood that the disclosed embodiments are merely exemplary of the composition and process and that they may be embodied in various and alternative forms of the disclosed embodiments. Therefore, specific procedural, structural and functional details which are addressed in the embodiments disclosed herein are not to be interpreted as limiting, but merely as a basis for the claims and as a representative basis for teaching one skilled in the art to variously employ the present composition and process.

The compositions of the present disclosure preferably comprise:
  from 9 to 30 percent by weight, more preferably from 14 to 30 percent by weight of component A) and/or from 1 to 25 percent by weight, more preferably from 1 to 10 percent by weight of component C).

In the compositions the present disclosure, the component A) (ii) is particularly preferred.

Grafted polyolefins (or live grafted polyolefins) suitable for use in making the grafted polyolefin composition A) are manufactured by reacting polyolefins with unsaturated monomers at elevated temperatures, with or without a free-radical initiator, under conditions effective to graft unsaturated monomer units onto the polyolefin backbone.

Polyolefins suitable for making the (live) grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified poly-propylenes, and the like, and blends thereof. Preferred polyolefins for making the grafted polyolefin are polyethylenes, particularly HDPE and LLDPE, and especially HDPE. Typically such HDPE has a density from 0.940 to 0.970 g/cm3. Throughout the present description and claims, all the density values are measured according to ASTM D 1505.

An unsaturated monomer reacts with the polyolefin to produce the grafted polyolefin. Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. Appl. Publ. Nos. 2004/0097637 and 2007/0054142, the teachings of which are incorporated herein by reference.

The relative amounts of unsaturated monomer and polyolefin used will vary and depend on factors such as the nature of the polyolefin and unsaturated monomer, reaction conditions, available equipment, and other factors. Usually, the unsaturated monomer is used in an amount within the range of 0.1 to 15 wt. %, preferably from 0.5 to 6 wt. %, and most preferably from 1 to 3 wt. %, based on the amount of (live) grafted polyolefin produced.

Grafting is accomplished according to known procedures, generally by heating a mixture of the polyolefin and unsaturated monomer(s). Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer and polyolefin to generate the (live) grafted polyolefin is performed at elevated temperatures, preferably within the range of 180° C. to 400° C., more preferably from 200° C. to 375° C., and most preferably from 230° C. to 350° C. Shear rates in the extruder can vary over a wide range, preferably from 30 to 1000 rpm, more preferably from 100 to 600 rpm, and most preferably from 200 to 400 rpm.

The expression "live, grafted polyolefin," as used herein refers to a grafted polyolefin that can further react with added olefin elastomer and any residual polyolefin, unsaturated monomer, and/or free-radical initiator used to make the grafted polyolefin. Commercially available grafted polyolefins (suitable for preparing the component A) (i) of the present compositions) are not "live" because the free-radical content has reacted out or has been quenched during workup of the product, typically during pelletization. A live, grafted polyolefin (suitable for preparing the component A) (ii) of the present compositions) contains active free-radical species generated thermally by visbreaking or from peroxide decomposition. The residual radical content allows reaction to continue upon combination of the freshly made grafted polyolefin, usually while still molten, with an added olefin elastomer. One or more of the grafted polyolefin, olefin elastomer, residual polyolefin, and residual unsaturated monomer may be involved in this secondary reaction.

Thus, in the second process step for making the component A) (ii), the live, grafted polyolefin (and any residual polyolefin and/or unsaturated monomer) is reacted with an olefin elastomer. This reaction can be performed using any suitable reactor. Conveniently, the reaction is performed by combining the freshly prepared live, grafted polyolefin with the olefin elastomer in a shear-imparting extruder/reactor as described earlier. In one particularly preferred approach, the live, grafted polyolefin is transferred while still molten from an outlet of a first extruder directly to a second extruder in which a reaction with the olefin elastomer occurs.

The amount of olefin elastomer used depends on the nature of the elastomer and grafted polyolefin, the desired tie-layer properties, reaction conditions, equipment, and other factors. Generally, however, the amount of elastomer used will be in the range of 5 to 60 wt. %, alternatively from 20 to 50 wt. %, alternatively from 25 to 35 wt. %, alternatively from 25 to 30 wt % based on the amount of grafted polyolefin composition produced.

The live, grafted polyolefin and the olefin elastomer react at elevated temperature, preferably at temperatures within the range of 120° C. to 300° C., more preferably from 135° C. to 260° C., and most preferably from 150° C. to 230° C. Preferably, the temperature for the reaction used to make this graft composition is lower than that used to make the live, grafted polyolefin. Shear rates in the extruder for this step can vary over a wide range, preferably from 30 to 1000 rpm, more preferably from 100 to 600 rpm, and most preferably from 200 to 400 rpm.

The resulting graft [polyolefin/elastomer] composition is conveniently quenched and pelletized at this point, but it can be combined immediately after preparation with the component B) as is described further below.

Suitable olefin elastomers include ethylene-propylene rubber (EPR), ethylene-propylene-diene monomer rubber (EPDM), the like, and mixtures thereof. As used herein, "elastomer" refers to products having rubber-like properties and little or no crystallinity. Preferably, the olefin elastomers contain from 10 to 80 wt. % of ethylene recurring units. More preferred olefin elastomers contain from 10 to 70 wt. % of ethylene units. Commercially available olefin elastomers include Lanxess Corporation's Buna® EP T2070 (68% ethylene, 32% propylene); Buna EP T2370 (3% ethylidene norbornene, 72% ethylene, 25% propylene); Buna EP T2460 (4% ethylidene norbornene, 62% ethylene, and 34% propylene); ExxonMobil Chemical's Vistalon® 707 (72% ethylene, 28% propylene); Vistalon 722 (72% ethylene, 28% propylene); and Vistalon 828 (60% ethylene, 40% propylene). Suitable ethylene-propylene elastomers also include Exxon Mobil Chemical's Vistamaxx® elastomers, particularly grades 6100, 1100, and 3000, and Dow Chemical's Versify® elastomers, particularly grades DP3200.01, DP3300.01, and DP3400.01, which have ethylene contents of 9, 12, and 15 wt %, respectively. Additional EPDM rubbers include Dow's Nordel™ hydrocarbon rubber, e.g., the 3722P, 4760P, and 4770R grades.

It has been surprisingly found that high grafting efficiencies can be achieved when live, grafted polyolefins are further reacted with an olefin elastomer. Normally, polyolefin grafting proceeds less than quantitatively.

In some embodiments, at least 90 wt. %, more preferably at least 95 wt. %, and most preferably at least 98 wt. %, of the unsaturated monomer is incorporated into the grafted polyolefin composition. The amount incorporated can be measured by wet chemical methods (titration, etc.) or more preferably by Fourier transform infrared spectroscopy (FTIR) according to methods that are well known in the art.

The grafted polyolefin composition A) preferably exhibits a weak but characteristic absorption, possibly a carbonyl absorption, in the infrared spectrum within the range of 1700 to 1750 cm$^{-1}$, preferably from 1725 to 1735 cm$^{-1}$, and most preferably at approximately 1730 cm$^{-1}$.

An advantage of the grafted polyolefin compositions A) (ii) is the ability to use a relatively low concentration in the tie-layer adhesives while achieving good adhesion and high clarity. The preparation of the grafted polyolefin composition A) (ii) is discussed in U.S. application Ser. No. 12/924,540 which is hereby incorporated by reference in its entirety.

Accordingly, in a particularly preferred embodiment, the grafted polyolefin composition is made by grafting maleic anhydride onto HDPE, followed by further reaction of the live, grafted polyolefin with EPR or EPDM, particularly EPR. Such compositions provide good adhesion and high clarity with less grafted material than is commonly needed when EPR or EPDM is simply blended with a grafted HDPE.

Suitable components B), typically called base resins, for the tie-layer adhesive compositions of the present disclosure include ethylene homopolymers; copolymers of ethylene with $C_3$-$C_8$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include MDPE; HDPE; LLDPE; very low density polyethylene; ultra low density polyethylene; ethylene-vinyl acetate (EVA) copolymers; ethylene-acrylate copolymers such as ethylene-ethyl acrylate copolymer and ethylene-n-butyl acrylate copolymers; and blends thereof.

LLDPE (linear low density polyethylene) is a preferred base resin B). In particular, the LLDPE is preferably a copolymer of ethylene and 1-butene, 1-hexene, or 1-octene. Preferably, the LLDPE has a density within the range of 0.895 to 0.925 g/cm$^3$ and a melt index (MI$_2$) within the range of 0.5 and 5 g/10 min, more preferably from 0.8 to 2.5 g/10 min. Suitable LLDPE base resins include the Petrothene® GA502, GA503, GA602, and GA616 series resins, which are products of Equistar Chemicals, LP. Throughout the present description and claims, all the melt index values are measured according to ASTM-D 1238, using a piston load of 2.16 kg and temperature of 190° C.

In a preferred aspect, the process for making the grafted polyolefin composition is integrated with a process for making the base resin B). In this process, freshly made polyethylene powder (e.g., LLDPE) is blended in line with the grafted composition to generate a mixture that is useful as a masterbatch or as a tie-layer adhesive. The grafted polyolefin composition can be in the form of pellets or it can be combined with the base resin powder B) immediately after the grafted composition is produced. In either case, the "in-line" process affords products with reduced thermal history and, frequently, improved properties (see U.S. Pat. No. 7,064,163, the teachings of which are incorporated herein by reference).

The base resin B) is also discussed in U.S. application Ser. No. 12/924,540 which is hereby incorporated by reference in its entirety.

It has been surprisingly found that adding a polyethylene polymer having long chain branching, namely component C), significantly improves properties. LDPE (low density polyethylene) is a preferred example of component C).

LDPE polymers have both short chain and long chain branching. Long chains are $C_6$ carbon chains or longer. The LDPE to be added to the tie layer composition can be an ethylene homopolymer or ethylene copolymerized with one or more monomers, such as vinyl acetate, methyl acrylate, acrylic acid, ethyl acrylate, or a $C_3$ $C_{10}$ α-olefin.

The LDPE to be added has a density ranging from about 0.900 g/cm$^3$ to about 0.930 g/cm$^3$, alternatively from 0.910 g/cm$^3$ to about 0.9250 g/cm$^3$, alternatively from 0.915 g/cm$^3$ to about 0.9200 g/cm$^3$. The melt index ranging from about 0.10 g/10 min to about 25.0 g/10 min, alternatively from about 1.0 g/10 min to about 10.0 g/10 min alternatively from about 0.2 g/10 min to about 0.4 g/10 min. The LDPE is preferably prepared by free radical, high pressure polymerization, in particular by using a tubular or autoclave high pressure polymerization process in the presence of a free radical initiator.

In the preferred embodiment, the LDPE is preferably ethylene homopolymer with a density of about 0.918 g/cm3 and a melt index of about 0.25 g/10 min. Suitable LDPE polymers include the Petrothene® series LDPE resins such as Petrothene® NA940, which are products of Equistar Chemicals, LP.

In addition to the components A), B) and C), the tie layer adhesive can include other commonly used components, including adhesion promoters, elastomeric polymers, UV inhibitors, antioxidants, thermal stabilizers, and the like. For some examples of these, see U.S. Pat. Appl. Publ. No. 2004/0097637, the teachings of which are incorporated herein by reference.

The tie layer adhesives will have improved adhesive strength. In some embodiments, the tie layer adhesives will have equal to or greater than 1.5 lbs/in, alternatively greater than 1.6 lbs/in, alternatively greater than 1.7 lbs/in measured after 1 day. In some embodiments, the tie layer adhesives will have equal to or greater than 1.5 lbs/in, alternatively greater than 1.6 lbs/in, alternatively greater than 1.9 lbs/in measured, alternatively greater than 2.2 lbs/in after 7 days. The aforementioned measurements are made according to ASTM D1876.

The tie-layer adhesives are valuable for bonding dissimilar materials in multilayer constructions, particularly films, sheets, pipes and other products. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

The adhesives are particularly valuable for making multilayer films and sheets, including barrier films. The multilayer films have at least two layers in addition to the adhesive layer, which bonds the other layers together. Usually, at least one layer serves as a barrier layer. Multilayer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically polar polymers such as ethylene-vinyl alcohol (EVOH) or polyamide resins such as nylon.

Multilayer barrier films are widely used for food packaging, and in most of these applications, clarity and high adhesion are important. Food packaging applications include formed bags, pouches, and casings for packaging meat and poultry products. They can also be used for snack foods, cereals, baking mixes, and the like. They may also have utility for cook-in packaging.

Tie-layer adhesives of the present disclosure can be used in numerous multilayer barrier film constructions, including structures having five, seven, nine, or more layers. Illustrative multilayer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
HDPE/adhesive/polyamide/adhesive/HDPE
EVOH/adhesive/HDPE/adhesive/EVOH
LDPE/adhesive/polyamide/adhesive/FCL
LDPE/adhesive/EVOH/adhesive/FCL
LLDPE/adhesive/EVOH/adhesive/FCL
LLDPE/adhesive/polyamide/adhesive/FCL
HDPE/adhesive/EVOH/adhesive/FCL
HDPE/adhesive/polyamide/adhesive/FCL Some commonly used sealable film constructions include:

LLDPE/adhesive/EVOH/adhesive/sealant
HDPE/adhesive/polyamide/adhesive/sealant
HDPE/adhesive/EVOH/adhesive/sealant where the sealant layer is, for example, EVA, LLDPE or ionomer.

The following examples merely illustrative and those skilled in the art will recognize many variations are available that are within the spirit of the present disclosure.

EXAMPLES

Compositions of inventive examples E1-E7 and comparative examples C1-C7 are summarized in Table 1. Properties of inventive examples E1-E7 and comparative examples C1-C7 are summarized in Table 2.

As illustrated in the specific, non-limiting examples summarized below, Component (A) can be a graft composition comprising the reaction product of a live, grafted polyolefin and an olefin elastomer.

In the specific, non-limiting examples summarized below, the live, grafted polyolefins are labeled as Graft-1 and Graft-2. Components (A-1) through (A-5) are Graft-1 and Graft-2 reacted with different amounts of EPR.

Components (A-1) Through (A-3): Graft-1/EPR Compositions

Graft-1 is a live, grafted polyolefin produced by feeding a high-density polyethylene (density: 0.957 g/cm$^3$) and maleic anhydride (2.2 wt. % based on total charged reactants) to a first COPERION® ZSK-92 twin-screw extruder having zones heated at temperatures ranging from 450° F. to 660° F. (230 to 350° C.) and operated at shear rates within the range of 200 to 400 rpm to produce a live, grafted polyolefin.

To produce components (A-1) through (A-3), Graft-1 exits the first extruder and immediately enters a second ZSK-92 twin-screw extruder, where it is combined and reacted with an ethylene-propylene rubber (EPR). The specific EPR employed in the specific, non-limiting examples summarized below is Vistalon® 722 (labeled in Table 1 as V722), which is a product of EXXONMOBIL® having 72 wt. % ethylene recurring units. In Table 1, V722 is indicated as being present at specific weight percentages. These weight percentages are weight percentages of the overall grafted polyolefin composition A). For example Graft-1 co-extruded with V722 @ 25% refers to a graft composition comprising the reaction product of a Graft-1 with V722, wherein the V722 is present in an amount of 25 percent by weight of the graft composition. Accordingly, components, (A-1), (A-2), and (A-3) include 25wt %, 30wt %, and 35wt % EPR respectively. The second extruder was operated at a temperature in a range of from 300° F. to 450° F. (150 to 230° C.); and a shear rate in a range of from 200 to 400 rpm. The resulting graft composition, Component (A) was then cooled and pelletized.

Components (A-4) and (A-5): Graft-2/EPR Compositions

Components (A-4) and (A-5) are produced the same as (A-1) through (A-3) except that Graft-2 is employed in place of Graft-1. Graft-2 is a live, grafted polyolefin produced by feeding a high-density polyethylene (density: 0.957 g/cm$^3$) and maleic anhydride (2.0 wt. % based on total charged reactants) to a first COPERION® ZSK-92 twin-screw extruder having zones heated at temperatures ranging from 450° F. to 660° F. (230 to 350° C.) and operated at shear rates within the range of 200 to 400 rpm to produce a live, grafted polyolefin.

The live Graft-2 is immediately extruded and reacted with V722 as in Examples (A-1) through (A-3) except that EPR is provided for (A-4) and (A-5) as 30wt % and 35wt % respectively.

Component B: LLDPE

As illustrated in the specific, non-limiting examples summarized below, Component (B) can be a base resin. The base resin can be a linear polyethylene, such as linear low density polyethylene (LLDPE). In the specific, non-limiting examples summarized below, the linear low density polyethylene is PETROTHENE® GA602050. GA602050 is a pelletized hexene based copolymer linear low density polyethylene (density: 0.917 g/cm$^3$; Melt Index, MI$_2$: 2.0 g/10 min.).

Component C: LDPE

Component (C) can be a polyethylene having long chain branching, such as low density polyethylene (LDPE). In the specific, non-limiting examples summarized below, the branched polyethylene is PETROTHENE® NA940. NA940 is an extrusion grade low density polyethylene (density: 0.918 g/cm$^3$; Melt Index, MI$_2$: 0.25 g/10 min.), produced by a free radical, high pressure polymerization process.

Additional Components D: Additives

As illustrated in the specific, non-limiting examples summarized below, Component (D) can be one or more additives. In the specific, non-limiting examples summarized below, IRGANOX® 1076 and IRGAFOS® 168 are employed as antioxidants. IRGANOX® 1076 is a sterically-hindered phenolic antioxidant available from CIBA®. IRGAFOS® 168 is a trisarylphosphite processing stabilizer also available from CIBA®.

According to the specific, non-limiting examples summarized in Table 1 components (A), (B), (C), and (D) were dry blended and melt extruded at 200-240° C. and 210-250 rpm to form Tie-Layer Adhesives in the amounts indicated. It is also possible to melt blend the components or combine them using other techniques known in the art.

TABLE 1

| Components | C1 | E1 | C2 | E2 | C3 | E3 | C4 | E4 | C5 | E5 | C6 | E6 | C7 | E7 |
|---|---|---|---|---|---|---|---|---|---|---|---|---|---|---|
| (A-1) Graft-1 + V722 @ 25% | 20 | 20 | 0 | 0 | 0 | 0 | 0 | 0 | 0 | 0 | 0 | 0 | 0 | 0 |
| (A-2) Graft-1 + V722 @ 30% (wt %) | 0 | 0 | 20 | 20 | 0 | 0 | 0 | 0 | 0 | 0 | 0 | 0 | 0 | 0 |
| (A-3) Graft-1 + V722 @ 35% (wt %) | 0 | 0 | 0 | 0 | 20 | 20 | 0 | 0 | 0 | 0 | 0 | 0 | 0 | 0 |
| (A-4) Graft-2 + V722 @ 30% (wt %) | 0 | 0 | 0 | 0 | 0 | 0 | 20 | 20 | 25 | 25 | 0 | 0 | 0 | 0 |
| (A-5) Graft-2 + V722@35% | 0 | 0 | 0 | 0 | 0 | 0 | 0 | 0 | 0 | 0 | 22.5 | 22.5 | 25 | 25 |
| (B) GA602050 (wt %) | 79.8 | 74.8 | 79.8 | 76.8 | 79.8 | 76.8 | 79.8 | 76.8 | 74.8 | 71.8 | 77.3 | 72.3 | 74.8 | 71.8 |
| (C) NA940 (wt %) | 0 | 5 | 0 | 3 | 0 | 3 | 0 | 3 | 0 | 3 | 0 | 5 | 0 | 3 |
| (D) IRGANOX ® 1076 (wt %) | 0.1 | 0.1 | 0.1 | 0.1 | 0.1 | 0.1 | 0.1 | 0.1 | 0.1 | 0.1 | 0.1 | 0.1 | 0.1 | 0.1 |
| (D) IRGAFOS ® 168 (wt %) | 0.1 | 0.1 | 0.1 | 0.1 | 0.1 | 0.1 | 0.1 | 0.1 | 0.1 | 0.1 | 0.1 | 0.1 | 0.1 | 0.1 |

Multi-Layer Films were prepared using the tie-layer adhesives of inventive examples E1-E7 and comparative examples C1-C7. Results are summarized in Table 2.

More specifically, five-layer films (3 mils) were produced using the tie-layer adhesives of inventive examples E1-E7 and comparative examples C1-C7. Each multilayer film was made on a Killion extruder (comprised of 3 extruders in this case) with a barrel length to barrel diameter (L/D) ratio of 24:1, a barrel diameter of about 1 to 1.25 inches, and 3 barrel heating zones.

| Extruder | Barrel Diameter | L:D Ratio | Heating Zones |
|---|---|---|---|
| Extruder 1 | 1.25 inches | 24:1 | 3 |
| Extruders 2 & 3 | 1 inch | 24:1 | 3 |

Killion extruders may be obtained from Killion Extruders, Inc. of Cedar Grove, N.J. Each multilayer film has the structure: HDPE/tie layer/EVOH/tie layer/HDPE. HDPE is ALATHON® M6210, a product of EQUISTAR® Chemicals, LP, which has an $MI_2$ of 0.95 dg/min and density of 0.958 g/cm³. Ethylene-vinyl alcohol copolymer (EVOH) is SOARNOL® DC3203 FB grade, product of Nippon Gohsei® Kagaku K.K., Japan. The layer distribution was 43%, 4%, 6%, 4%, and 43%, respectively based on total film or sheet thickness. Other coextrusion processes can be employed in the art including blown film processes.

Film samples are tested for adhesion according to ASTM D1876. The force required to separate the film apart in a T-peel configuration at 25.4 mm (10 inches)/min is measured using an INSTRON® tensile tester. The average adhesion of five specimens is recorded as the peel strength in lb/in. Adhesion values are reported in Table 2.

Film samples were also tested for clarity using Narrow Angle Scattering (NAS) measurements. NAS refers to the see through clarity. The higher the value, the better the see through clarity. NAS can be reduced by interfacial disturbances due to adhesion of a tie-layer to a barrier substrate. Typically, the higher the adhesion, the lower the NAS, but the data presented in Table 2 is unique, because higher adhesion and generally higher clarity were observed upon the addition of LDPE to tie layer formulations. NAS measurements were performed using a ZEBEDEE® CL-100 clarity meter. The samples were cut into 10×10 cm squares and adhered to the test unit in the front of the light source by air suction. The average clarity of seven specimens is recorded as the average clarity.

TABLE 2

| Properties | C1 | E1 | C2 | E2 | C3 | E3 | C4 | E4 | C5 | E5 | C6 | E6 | C7 | E7 |
|---|---|---|---|---|---|---|---|---|---|---|---|---|---|---|
| Adhesion 3 mil film after 1 day (lb/in) | 1.3 | 1.5 | 1.7 | 1.8 | 1.4 | 1.6 | 1.2 | 1.3 | 1.5 | 1.7 | 1.35 | 1.5 | 1.5 | 1.7 |
| Adhesion 3 mil film after 7 days (lb/in) | NT | NT | 2.2 | 2.3 | 1.9 | 2.0 | 1.5 | 1.6 | 1.8 | 1.9 | NT | NT | 1.9 | 2.2 |

TABLE 2-continued

| Properties | C1 | E1 | C2 | E2 | C3 | E3 | C4 | E4 | C5 | E5 | C6 | E6 | C7 | E7 |
|---|---|---|---|---|---|---|---|---|---|---|---|---|---|---|
| NAS (Average of 7 specimens) | 25 | 25 | 28.9 | 31.7 | 35.4 | 39.9 | 34 | 35 | 34 | 34 | 20 | 25 | 28 | 30 |

Note:
"NT" means "not tested."

The results demonstrate that blends of a polyethylene having long chain branching, such as low density polyethylene (LDPE), along with a linear polyethylene, such as linear low density polyethylene (LLDPE) and a graft composition comprising the reaction product of a live, grafted polyolefin and an olefin elastomer can produce in tie-layer adhesives with improved clarity and adhesion. The addition of polyethylene having long chain branching, such as LDPE, to adhesive formulations unexpectedly shows simultaneous improvement in both adhesion and clarity compared to adhesive formulations without LDPE.

Additional Examples: Film Quality

Compositions of inventive examples E8-E11 and comparative examples C8-C10 are summarized in Table 3. Properties of inventive examples E8-E11 and comparative examples C8-C10 are summarized in Tables 4 and 5.

TABLE 3

| Component | C8* | E8* | E9 | C10 | E10 | E11 |
|---|---|---|---|---|---|---|
| (A-3) Graft 1 + 35% V722 | 20 | 20 | 20 | 0 | 0 | 0 |
| (A-5) Graft 2 + 35% V722 | 0 | 0 | 0 | 20 | 20 | 20 |
| (B) GA602050 | 79.8 | 76.8 | 74.8 | 79.8 | 76.8 | 74.8 |
| (C) NA940-000 | 0 | 3 | 5 | 0 | 3 | 5 |
| (D) Irganox 1076 | 0.1 | 0.1 | 0.1 | 0.1 | 0.1 | 0.1 |
| (D) Irgafos 168 | 0.1 | 0.1 | 0.1 | 0.1 | 0.1 | 0.1 |

*C8 and E8 are the same compositions as C3 and E3 respectively

The film quality of each of the mono-layers was optoelectronically assessed using high-resolution line cameras and the appropriate illumination technologies. More specifically, the FSA 100 modular surface inspection system, available from Optical Control Systems GmbH, was employed to determine the total number of gels in the monolayer film samples. Properties of inventive examples E8-E11 and comparative examples C8-C10 are summarized in Tables 4 and in FIG. 1.

TABLE 4

| Property | C8 | E8 | E9 | C10 | E10 | E11 |
|---|---|---|---|---|---|---|
| Gel Count (10 meter²) | 39,760 | 30,185 | 24,648 | 33,321 | 24,846 | 21,607 |

Table 5 shows the calculation of the total number of defects. The improvement in film quality is demonstrated by the reduced number of defects in E8, E9, E10, E11 compared to C8 and C10.

TABLE 5

| Property | C8 | E8 | E9 | C10 | E10 | E11 |
|---|---|---|---|---|---|---|
| Total Defect Area in PPM | 109 | 86 | 75 | 98 | 87 | 67 |

What is claimed is:

1. A composition comprising:
    A) from 1 to 30 percent by weight of a grafted polyolefin copolymer comprising:
        (i) a grafted polyolefin
        (ii) an olefin elastomer
        wherein the grafted polyolefin is chemically bonded to the olefin elastomer, and wherein the olefin elastomer is present in the range of 5 to 60 wt % of the grafted polyolefin copolymer;
    B) from 65 to 85 percent by weight of a linear polyethylene;
    C) from 0.5 to 25 percent by weight of a polyethylene having long chain branching; and
    D) optionally one or more additives.

2. The composition of claim 1 wherein the grafted polyolefin or the live grafted polyolefin is high-density polyethylene (HDPE) grafted with maleic anhydride.

3. The composition of claim 1 wherein the olefin elastomer is ethylene-propylene rubber (EPR) or ethylene-propylene-diene monomer rubber (EPDM).

4. The composition of claim 1, wherein component A) contains from 5 to 30 percent by weight of at least one grafted polyolefin copolymer.

5. The composition of claim 1, wherein the linear polyethylene in component B) is a linear low density polyethylene (LLDPE).

6. The composition of claim 1, wherein the branched polyethylene in component C) is a low density polyethylene (LDPE).

7. The composition of claim 1, wherein component D) is present and the one or more additives are selected from the group consisting of antioxidants, stabilizers, and combinations thereof.

8. The composition of claim 1 wherein the composition is a tie layer adhesive.

9. A multi-layered film comprising a tie-layer adhesive consisting of
    A) from 1 to 30 percent by weight of a grafted polyolefin copolymer comprising:
        (i) a grafted polyolefin
        (ii) an olefin elastomer
        wherein the grafted polyolefin is chemically bonded to the olefin elastomer, and wherein the olefin elastomer is present in the range of 5 to 60 wt % of the grafted polyolefin copolymer;
    B) from 65 to 85 percent by weight of a linear polyethylene;
    C) from 0.5 to 25 percent by weight of a polyethylene having long chain branching; and
    D) optionally one or more additives.

10. The multi-layered film of claim 9, wherein components A), B), C), and optionally D) are dry blended and melt extruded to form the tie-layer adhesive.

11. The multi-layered film of claim 9, wherein the multi-layered film comprises a layer of polyolefin and a layer comprising a polar polymer.

12. The multilayer film of 11, wherein the polar polymer is ethylene vinyl alcohol copolymer (EVOH) or a polyamide.

13. A process for producing a tie-layer adhesive comprising:
  reacting a grafted polyolefin with an olefin elastomer to produce a grafted polyolefin composition;
  compounding
    from 1 to 30 percent by weight of said grafted polyolefin composition,
    from 65 to 85 percent by weight of a linear polyethylene,
    from 0.5 to 25 percent by weight of a polyethylene having long chain branching, and optionally one or more additives to form a tie-layer adhesive.

14. The process of claim 13 wherein the grafted polyolefin is high-density polyethylene (HDPE) grafted with maleic anhydride.

15. The process of claim 13 wherein the olefin elastomer is ethylene-propylene rubber (EPR) or ethylene-propylene-diene monomer rubber (EPDM).

* * * * *